(12) United States Patent
Imai et al.

(10) Patent No.: US 8,599,282 B2
(45) Date of Patent: Dec. 3, 2013

(54) METHOD AND APPARATUS FOR GENERATING IMAGE

(75) Inventors: Francisco Imai, Mountain View, CA (US); Sung Ho Park, San Jose, CA (US); Won-hee Choe, Gyeongju-si (KR); Seong-deok Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 212 days.

(21) Appl. No.: 11/790,663

(22) Filed: Apr. 26, 2007

(65) Prior Publication Data

US 2008/0266418 A1  Oct. 30, 2008

(51) Int. Cl.
*H04N 5/335* (2011.01)

(52) U.S. Cl.
USPC ..................... 348/229.1; 348/223.1

(58) Field of Classification Search
None
See application file for complete search history.

(56) References Cited

U.S. PATENT DOCUMENTS

| | | | | |
|---|---|---|---|---|
| 6,747,694 B1 * | 6/2004 | Nishikawa et al. | ........ | 348/229.1 |
| 6,947,079 B2 * | 9/2005 | Parulski et al. | ............ | 348/223.1 |
| 6,999,617 B1 * | 2/2006 | Ohga | ............................ | 382/167 |
| 7,057,650 B1 * | 6/2006 | Sakamoto | ...................... | 348/239 |
| 7,336,314 B2 * | 2/2008 | Yamada | ........................ | 348/371 |
| 7,446,303 B2 * | 11/2008 | Maniam et al. | ............... | 250/226 |
| 2003/0086004 A1 * | 5/2003 | Usami | ........................ | 348/223.1 |
| 2004/0051790 A1 * | 3/2004 | Tamaru et al. | ............. | 348/223.1 |
| 2004/0085458 A1 * | 5/2004 | Yanof et al. | ................ | 348/223.1 |
| 2004/0085459 A1 * | 5/2004 | Hoshuyama et al. | ...... | 348/223.1 |
| 2004/0135899 A1 * | 7/2004 | Suemoto | .................... | 348/223.1 |
| 2004/0179113 A1 * | 9/2004 | Suzuki | ........................ | 348/223.1 |
| 2004/0201727 A1 * | 10/2004 | Ichikawa et al. | ........... | 348/223.1 |
| 2004/0201731 A1 | 10/2004 | Kakinuma et al. | ......... | 348/229.1 |
| 2005/0168596 A1 * | 8/2005 | Ito et al. | ..................... | 348/222.1 |
| 2005/0213128 A1 * | 9/2005 | Imai et al. | ...................... | 358/1.9 |
| 2005/0219380 A1 * | 10/2005 | Wu | .............................. | 348/223.1 |
| 2005/0280716 A1 * | 12/2005 | Toyoda | ........................ | 348/222.1 |
| 2006/0029382 A1 * | 2/2006 | Uchida | .......................... | 396/166 |
| 2007/0126887 A1 * | 6/2007 | Chino et al. | ................ | 348/223.1 |
| 2008/0088857 A1 * | 4/2008 | Zimmer et al. | ................ | 358/1.6 |

FOREIGN PATENT DOCUMENTS

| | | |
|---|---|---|
| JP | 11066279 | 3/1993 |
| JP | 2000236559 | 8/2000 |
| KR | 2001-0007236 | 1/2001 |
| WO | WO 99/67949 | * 12/1999 |

* cited by examiner

*Primary Examiner* — John Villecco
*Assistant Examiner* — Dwight C Tejano
(74) *Attorney, Agent, or Firm* — Staas & Halsey LLP

(57) ABSTRACT

A method and apparatus for generating an image is provided. The method includes acquiring a plurality of images using different exposure amounts, white-balancing each of the raw images, and synthesizing the white-balanced images producing as a result an absolute HDR image.

14 Claims, 6 Drawing Sheets

METHOD AND APPARATUS FOR GENERATING IMAGE

BACKGROUND OF THE INVENTION

1. Field of the Invention

The present invention relates to a method and apparatus for generating an image, and more particularly, to a method and apparatus for generating an image which can generate a colorimetrically-corrected high-dynamic range (HDR) image by acquiring a plurality of images through multiple exposures, white-balances the plurality of images with respect to a reference correlated color temperature (CCT), and synthesizing the white-balanced images.

2. Description of the Related Art

In recent years, the distribution of digital cameras and devices equipped with high-resolution cameras such as camera phones has been widespread. These cameras generally include lenses and image sensors.

Lenses collect light reflected from a subject, and image sensors detect light collected by lenses and convert it into electrical image signals. Image sensors consist generally of solid-state image sensors. Examples of the solid-state image sensors include a charge coupled device (CCD) and a complementary metal oxide semiconductor (CMOS).

Image sensors of cameras may include a color filter array (CFA) which consists of a mosaic of color filters in which each color filter filters light reaching each pixel. Since image sensors are highly sensitive to near-Infrared (NIR) light radiation, image sensors of cameras may also include a NIR shield filter which is mounted on a CFA for preventing image discolorations caused by NIR light radiation.

In the meantime, in the case of capturing images in a high-illumination or low-illumination environment or in a sharp contrast environment with backlighting, conventional image sensors may not be able to accurately render color images because their inherent limitations in dynamic range. As a result, the rendered image will loose information either in the shadows or in the highlights for HDR scenes.

In order to address this problem, high dynamic range (HDR) image sensors capable of accurately capturing images even in a high-illumination or low-illumination environment or in a sharp contrast environment with backlighting have been developed. However, HDR image sensors are generally expensive sensors mainly used for security and military purposes and they are not suitable for consumer products due to their cost and complexity.

Conventionally, an HDR image is created by generating a plurality of images using different light exposure amounts and synthesizing the images.

For example, in the case of capturing images of a subject in a backlighting state while varying an exposure amount, short-exposure images contains highlighted area without saturation but dark shadow areas will not be visible, whereas long-exposure images may have visibility in the dark areas but lost information in bright areas due to saturation. However, HDR images can be obtained by combining a short-exposure image with a long-exposure image.

Conventional methods of generating an HDR image involve encoding a number of images into red-green-blue (RGB) images through radiometrical correction and synthesizing the RGB images and generally result in images with poor color fidelity. A plurality of images obtained using different exposure durations generally have different white points. For example, long-exposure images have high correlated color temperatures (CCTs) in shadow areas, whereas short-exposure images have lower CCTs from high-illuminated areas. However, in conventional methods of generating an HDR image, a plurality of images are white-balanced without consideration of the white points of the images, and then the white-balanced images are synthesized, thereby resulting in an HDR image with poor color fidelity.

SUMMARY OF THE INVENTION

The present invention provides a method and apparatus for generating an image which can generate a colorimetrically-corrected high-dynamic range (HDR) image by acquiring a plurality of images through multiple exposures, white-balancing the plurality of images using a reference correlated color temperature (CCT), and synthesizing the white-balanced images.

However, the objectives of the present invention are not restricted to the one set forth herein. The above and other objectives of the present invention will become more apparent to one of daily skill in the art to which the present invention pertains by referencing a detailed description of the present invention given below.

According to an aspect of the present invention, there is provided a method of generating an image, the method including acquiring a plurality of raw images using different exposure amounts, white-balancing each of the raw images and synthesizing the white-balanced images.

According to another aspect of the present invention, there is provided an apparatus for generating an image, the apparatus including an image acquisition module which acquires a plurality of images using different exposure amounts, a white balancing module which white-balances each of the raw images, and an image synthesization module which synthesizes the white-balanced images.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
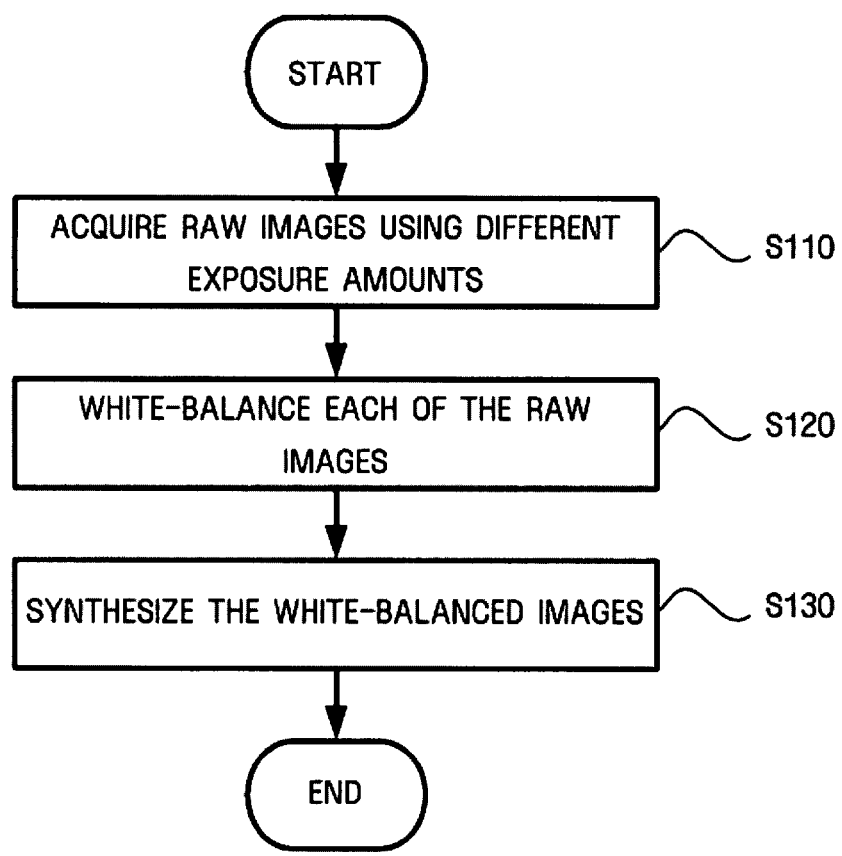
FIG. 1 is a flowchart illustrating a method of generating an image according to an embodiment of the present invention.

The present invention will now be described more fully with reference to the accompanying drawings, in which exemplary embodiments of the invention are shown.

The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements, and thus their description will be omitted.

FIG. 1 is a flowchart illustrating a method of generating an image according to an embodiment of the present invention. Referring to FIG. 1, in operation S110, an image capturing module 510 acquires a plurality of images using different exposure amounts. The images obtained in operation S110 have not yet been processed by, for example, white balancing and color correction, and thus will hereinafter be referred to as raw images.

In operation S120, a white balancing module 520 white-balances each of the raw images obtained in operation S110. The raw images obtained in operation S110 may be white-balanced with respect to a reference correlated color temperature (CCT). The reference CCT may be an arbitrary CCT set by a user. For example, in the situations when a standard RGB (sRGB) encoding method is used, trimulus values X, Y, and Z must be based on D65. In general, a color temperature range of 5000-10000 K is considered as being a proper white point range for white balancing. D65 is one of the most widely-used standard white points and corresponds to a color temperature of about 6500 K.

Two images obtained using different exposure durations may have different CCTs. For example, a long-exposure image may have a color temperature of 7000 K, whereas a short-exposure image may have a color temperature of 5000 K. Accordingly, a plurality of images obtained using different exposure durations may have different white points. In order to address this, each of a plurality of images obtained using different exposure durations may be white-balanced using a reference CCT of, for example, 6500 K, as a white point. How to white-balance a raw image will be described later in detail with reference to FIGS. 2 and 3.

In operation S130, the image synthesization module 530 generates an HDR image, which is colorimetrically corrected, by synthesizing the white-balanced images obtained in operation S120. In this case, the image synthesization module 530 may synthesize the white-balanced images in such a manner that all three channel values X, Y, and Z of each of the white-balanced images can be simultaneously synthesized using appropriate Gaussian weights or in such a manner that the luminance Y of each of the white-balanced images can be synthesized with the channel values X and Z of a long-exposure image. These synthesization manners are well known to one of ordinary skill in the art to which the present invention pertains, and thus, detailed descriptions thereof will be skipped.

Operation S120 will hereinafter be described in further detail with reference to FIGS. 2 and 3.

Figure 2:
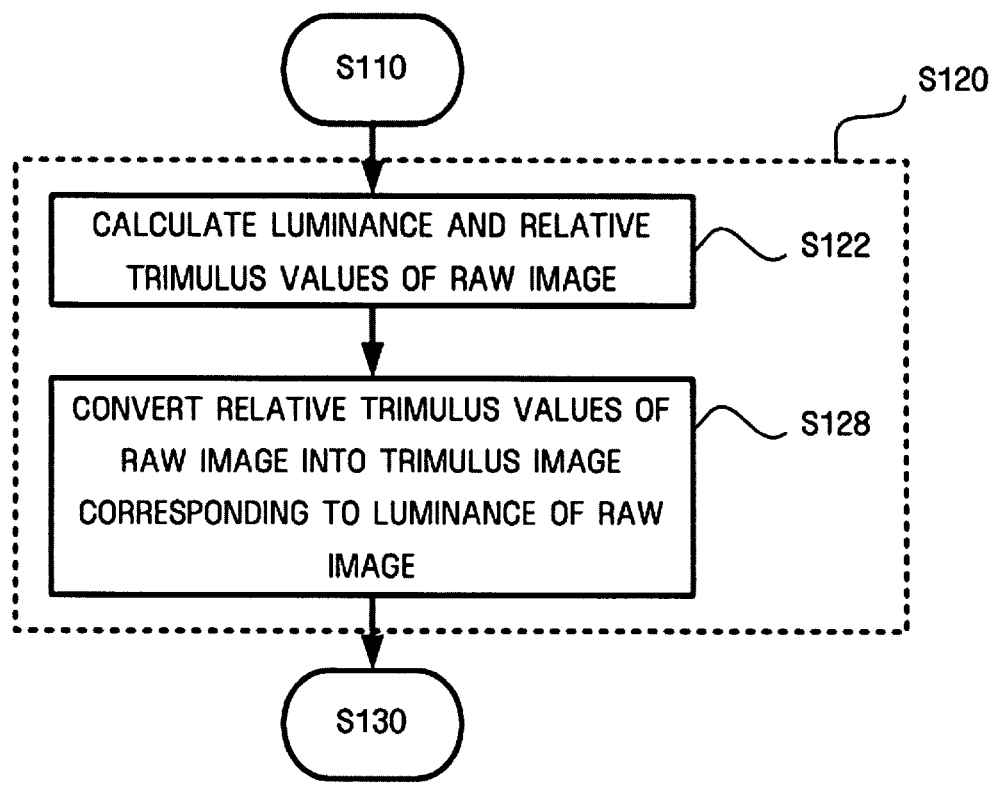
FIG. 2 is a flowchart illustrating operation S120 of FIG. 1.
Figure 3:
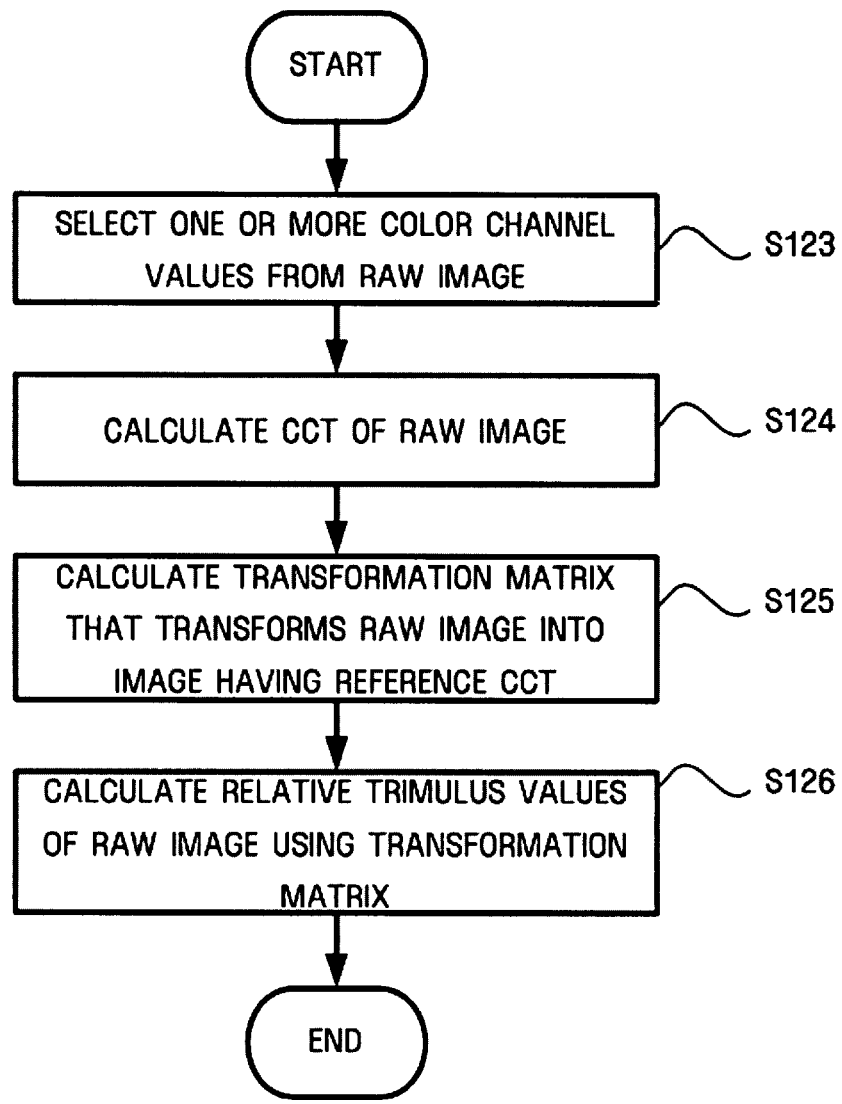
FIG. 3 is a flowchart illustrating the calculation of relative trimulus values of a raw image, according to an embodiment of the present invention.

FIG. 2 is a flowchart illustrating operation S120 of FIG. 1, and FIG. 3 is a flowchart illustrating the calculation of relative trimulus values of a raw image, according to an embodiment of the present invention.

Referring to FIG. 2, in operation S122, a luminance calculation unit 521 calculates the luminance of each of a plurality of raw images obtained using different exposure amounts, and a relative trimulus value calculation unit 522 calculates relative trimulus values X, Y, and Z of each of the raw images with respect to a reference CCT (S122)).

The luminance of a raw image may be calculated by multiplying a plurality of color channel values of the raw image by a plurality of weights, respectively, and adding up the results of the multiplication, as indicated by Equation (1):

$$Y = K(W1*C1 + W2*C2 + W3*C3) \quad (1)$$

where Y indicates the luminance of a raw image, C1, C2, and C3 indicate color channel values of the raw image, W1, W2, and W3 indicate weights respectively corresponding to the color channel values C1, C2, and C3, and K is a coefficient that affects the luminance Y and is determined according to an exposure duration, a diaphragm value, or a gain value.

The relative trimulus values are trimulus values that are converted with respect to the reference CCT. A plurality of raw images obtained using different exposure amounts may have different CCTs, and the trimulus values of each of the images are determined according to the CCT of a corresponding raw image. Thus, the trimulus values of each of the raw images are converted with respect to the reference CCT. The calculation of relative trimulus values will be described later in further detail with reference to FIG. 3.

Referring to operation S120 of FIG. 2, in operation S128, a relative trimulus value conversion unit 523 converts the relative trimulus values obtained in operation S122 into trimulus values corresponding to the luminance obtained in operation S122, in consideration that trimulus values corresponding to a predetermined CCT vary according to luminance. In short, each of the raw images obtained in operation S110 may be white-balanced in the above-described manner. Then, the white-balanced images are synthesized, thereby obtaining an image that is white-balanced at the reference CCT.

The calculation of the relative trimulus values of a raw image will hereinafter be described in detail with reference to FIG. 3.

Referring to FIG. 3, in operation S123, a color channel value selector 524 selects one or more color channel values within a predefined threshold range from a raw image. The color channel value selector 524 uses the predefined threshold range because color channel values selected from dark shadow areas or highlight areas in images may not be meaningful. For example, a shadow area in a short-exposure image may have as low a color channel value as noise, and thus, one or more color channel values may be selected from the shadow area of the short-exposure image only if the color channel values are greater than a predefined lower threshold. On the contrary, a highlight area in a long-exposure image may have as high a color channel value as a saturated color channel value, and thus, one or more color channel values may be selected from the highlight area of the long-exposure image only if the color channel values are less than a predefined upper threshold. In short, the color channel value selector 524 may select one or more color channel values within the range of the lower threshold and the upper threshold from the raw image.

In operation S124, a CCT calculator 525 calculates a CCT of the raw image. There are many ways to estimate CCT from color channels. As an example, if the color channel values selected in operation S123 are C1 and C2, the CCT calculator 525 could calculate the ratio of the selected color channel values, for instance, as C1/C2. If the raw image is an image obtained using a red-green-blue (RGB) color filter array (CFA) that consists of an R filter, a G filter, and a B filter, then C1/C2 may be R/B. On the other hand, if the raw image is an image obtained using a cyan-magenta-yellow (CMY) CFA that consists of a C filter, an M filter, and a Y filter, then C1/C2 may be C/Y. In this example, the idea is to calculate ratio between less correlated or redundant channels.

A color channel value ratio of an image has a relationship with a CCT of the image. Therefore, the CCT calculator 525 may calculate the CCT of the raw image by referencing a lookup table which indicates the relationship between color channel value ratios and CCTs. If the ratio of the selected color channel values matches none of the color channel value ratios included in the lookup table, the CCT calculator 525 may calculate the CCT of the raw image by performing an interpolation operation.

Thereafter, the raw image is transformed into an image having a reference CCT. The transformation of the raw image involves calculating a transformation matrix that transforms the raw image into an image having the reference CCT (S125) and calculating the relative trimulus values of the raw image by applying the transformation matrix to the raw image. For example, if the CCT of the raw image is 5000 K and the reference CCT is 6500 K, the raw image may be transformed into an image having the reference CCT of 6500 K. A transformation matrix calculator 526 may calculate the transformation matrix by referencing a lookup table which indicates the relationship among CCTs, reference CCTs, and transformation matrices. The transformation matrix calculator 526 calculates the relative trimulus values of the raw image with respect to the reference CCT by applying the transformation matrix to the raw image.

The relative trimulus values of the raw image determined using the method illustrated in FIG. 3 may be converted into trimulus values corresponding to the luminance of the raw image, thereby completing white balancing.

Figure 4:
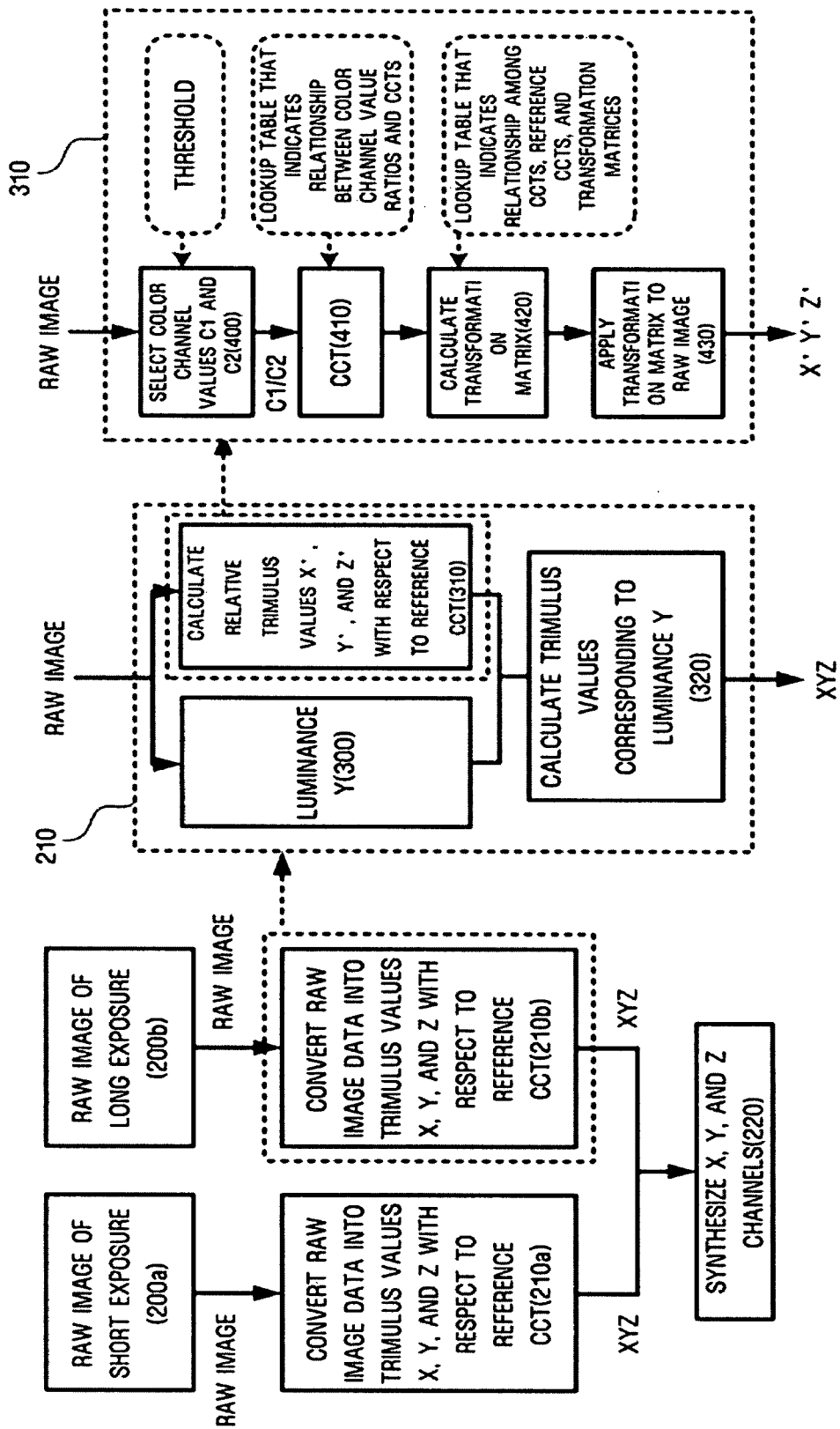
FIG. 4 illustrates data conversion processes during the generation of a high-dynamic range (HDR) image using two raw images obtained using different exposure durations.

FIG. 4 illustrates data conversion processes during the generation of an HDR image using two raw images obtained using different exposure durations. Referring to FIG. 4, a raw image 200a is obtained using a short exposure duration, and a raw image 200b is obtained using a long exposure duration. The raw images 200a and 200b are white-balanced (210a and 210b). More specifically, luminance Y is calculated (300), and relative trimulus values X', Y', and Z' are calculated (310). Thereafter, trimulus values X, Y, and Z are calculated by applying the luminance Y to the relative trimulus values X', Y', and Z'. The calculation of the relative trimulus values X', Y', and Z' (300) involves selecting color channel values C1 and C2 from each of the raw images 200a and 200b using a predefined threshold range (400); and calculating a CCT with reference to a lookup table that indicates the relationship between color channel value ratios and CCTs (410). Thereafter, a transformation matrix that transforms a raw image into an image having a reference CCT is calculated with reference to a lookup table which indicates the relationship among CCTs, reference CCTs, and transformation matrices (420). The transformation matrix is applied to the raw images 200a and 200b (430), thereby obtaining the relative trimulus values X', Y', and Z'. Finally, the trimulus values X, Y, and Z of the raw image 200a and the trimulus values X, Y, and Z of the raw image 200b are synthesized (220), thereby generating an HDR image.

According to the above-described method of generating an image, it is possible to expand a dynamic range for display devices using low-dynamic range (LDR) sensors. In addition, it is possible to display HDR images with improved color fidelity not only using HDR display devices but also using LDR display devices.

Figure 5:
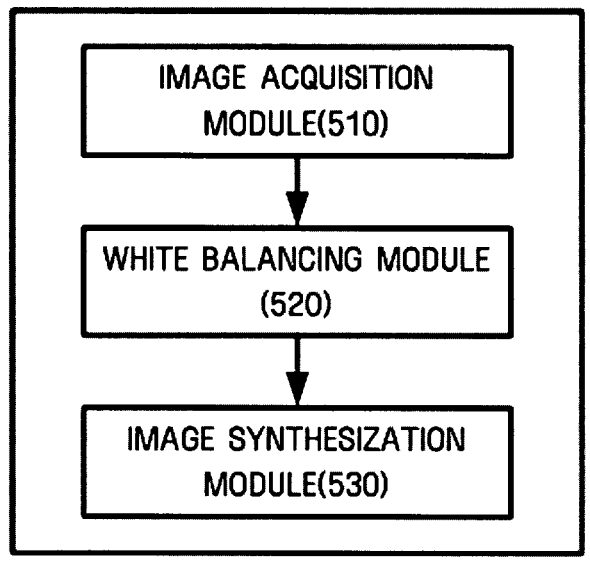
FIG. 5 is a block diagram of an apparatus for generating an image according to an embodiment of the present invention.
Figure 6:
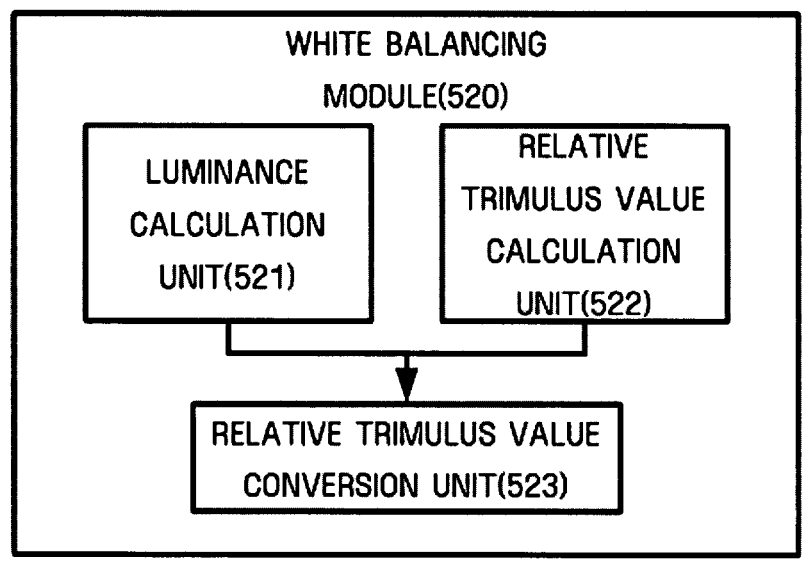
FIG. 6 is a block diagram of a white balancing module illustrated in FIG. 5.
Figure 7:
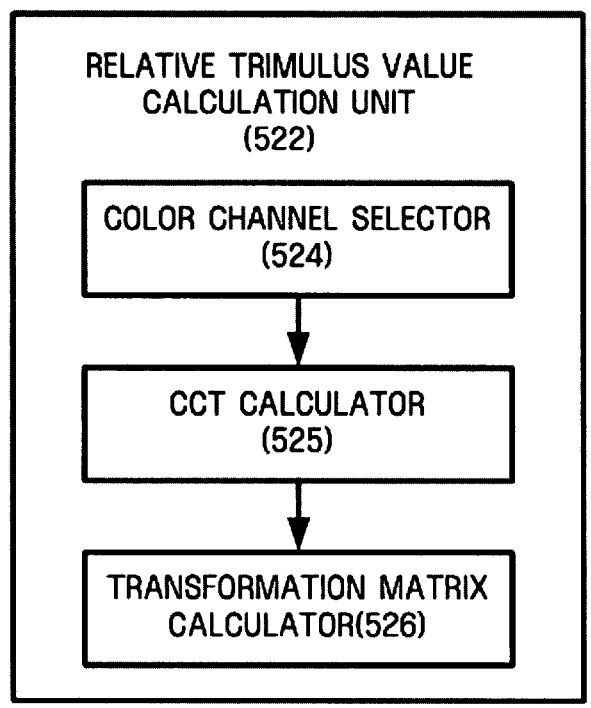
FIG. 7 is a block diagram of a relative trimulus value calculation unit illustrated in FIG. 6.

FIG. 5 is a block diagram of an apparatus for generating an image according to an embodiment of the present invention, FIG. 6 is a block diagram of a white balancing module 520 illustrated in FIG. 5, and FIG. 7 is a block diagram of a relative trimulus value calculation unit 522 illustrated in FIG. 6.

Referring to FIG. 5, the apparatus includes an image acquisition module 510, the white balancing module 520, and an image synthesization module 530. Referring to FIG. 6, the white balancing module 520 includes a luminance calculation unit 521, the relative trimulus value calculation unit 522, and a relative trimulus value conversion unit 523. Referring to FIG. 7, the relative trimulus value calculation unit 522 includes a color channel value selector 524, a CCT calculator 525, and a transformation matrix calculator 526.

The term 'module', as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

The apparatus illustrated in FIG. 5 may be construed as being a device such as a digital camera which is capable of storing images of a subject with the aid of a solid-state image sensor (such as a charge coupled device (CCD) or a complementary metal oxide semiconductor (CMOS)). The apparatus illustrated in FIG. 5 may be a camera phone or a personal digital assistant (PDA) which is equipped with a solid-state image sensor, like a digital camera, but the present invention is not restricted to this.

The image acquisition module 510 acquires a plurality of raw images while varying an exposure amount. More specifically, the image acquisition module 510 may acquire a plurality of images of a single scene using different exposure durations. The image acquisition module 510, like a typical image acquisition device such as a digital camera, may include a lens which collects light reflected from a subject, a filter which filters incident light, a photographing unit which senses the incident light, and an image signal processing unit which converts the sensed light, but the present invention is not restricted to this.

The white balancing module 520 white-balances each of the raw images obtained by the image acquisition module 510. The white balancing module 520 may include the luminance calculation unit 521, the relative trimulus value calculation unit 522, and the relative trimulus value conversion unit 523 illustrated in FIG. 6.

The luminance calculation unit 521 calculates the luminance of a raw image. More specifically, the luminance calculation unit 521 may calculate the luminance of the raw image by respectively multiplying a plurality of color channel values of the raw image by a plurality of weights and adding up the results of the multiplication.

Assuming that a reference CCT is set to D65, i.e., 6500 K, the relative trimulus value calculation unit 522 calculates trimulus values of the raw image using the reference CCT of 6500 K. Referring to FIG. 7, the relative trimulus value calculation unit 522 includes the color channel value selector 524, the CCT calculator 525, and the transformation matrix calculator 526.

The color channel value selector 524 selects one or more color channel values within a predefined threshold range from a raw image. More specifically, if the raw image is a short-exposure image, the color channel value selector 524 may set a color channel value corresponding to noise as a lower threshold. Then, the color channel value selector 524 may select one or more color channels greater than the lower threshold from the raw image, and abandon other color channel values less than the lower threshold. On the other hand, if the raw image is a long-exposure image, the color channel value selector 524 may set a color channel value that saturates as an upper threshold, and select one or more color channel values less than the upper threshold from the raw image. In short, the color channel value selector 526 selects one or more color channel values within the range of the lower threshold and the upper threshold from the raw image.

The CCT calculator 525 calculates the CCT of the raw image by calculating the ratio of color channel values selected by the color channel value selector 524. More specifically, if the raw image is obtained using an RGB CFA, the ratio of the selected color channel values may be R/B. If the raw image is obtained using a CMY CFA, the ratio of the selected color channel values may be C/Y. The CCT calculator 525 may calculate the CCT of the raw image by referencing a lookup table which indicates the relationship between color channel value ratios and color temperatures or by performing an interpolation operation.

The transformation matrix calculator 526 calculates a transformation matrix using the CCT determined by the CCT calculator 525. The transformation matrix transforms the raw image into an image having the reference CCT. The transformation matrix calculator 526 may calculate the transformation matrix by referencing a lookup table which indicates the relationship among CCTs, reference CCTs, and transformation matrices or by performing an interpolation operation.

Referring to FIG. 6, the relative trimulus value conversion unit 523 converts the relative trimulus values obtained by the relative trimulus calculator 522 into trimulus values corresponding to the luminance determined by the luminance calculator 521.

Referring to FIG. 5, the image synthesization module 530 generates a colorimetrically-corrected HDR image by synthesizing a plurality of white-balanced images obtained by the white balancing module 520.

As described above, the method and apparatus for generating an image according to the present invention provide the following advantages.

First, the method and apparatus for generating an image according to the present invention can generate an HDR image with improved visibility.

Second, the method and apparatus for generating an image according to the present invention can generate an HDR image without a requirement of expensive HDR sensors.

Third, the method and apparatus for generating an image according to the present invention can output an HDR image not only to an HDR display device but also to an LDR display device.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of generating an image, the method comprising:
  acquiring a plurality of raw images using different exposure durations of a single scene under substantially the same lighting conditions;
  white-balancing each of the raw images having different correlated color temperature(CCT)s based on a same arbitrary reference correlated color temperature (CCT) set by a user; and
  synthesizing the white-balanced images to generate a High Dynamic Range (HDR) image which is colorimetrically corrected,
  wherein the white-balancing comprises setting a color channel value corresponding to noise as a lower threshold when the raw image is a short-exposure image and selecting one or more color channel values greater than the lower threshold from the raw image and setting a color channel value that saturates as an upper threshold when the raw image is a long-exposure image and selecting one or more color channel values less than the upper threshold from the raw image.

2. The method of claim 1, wherein the white-balancing further comprises:
  calculating luminance of a raw image and calculating relative trimulus values of the raw image with respect to the arbitrary reference correlated color temperature (CCT); and
  converting the relative trimulus values of the raw image into trimulus values corresponding to the luminance of the raw image.

3. The method of claim 2, wherein the calculation of the luminance of the raw image, comprises calculating the luminance of the raw image using the following equation:

$$Y = K(W1*C1 + W2*C2 + W3*C3)$$

where Y indicates the luminance of the raw image, C1, C2, and C3 indicate color channel values of the raw image, W1, W2, and W3 indicate weights respectively corresponding to the color channel values C1, C2, and C3, and K is a coefficient that affects the luminance Y and is determined according to an exposure duration, a diaphragm value, or a gain value.

4. The method of claim 2, wherein the calculation of the relative trimulus values of the raw image, further comprises:
  calculating a CCT of the raw image by calculating a ratio of the selected color channel values;
  calculating a transformation matrix that transforms the raw image into an image having the reference CCT using the CCT of the raw image; and
  calculating the relative trimulus values of the raw image by applying the transformation matrix to the raw image.

5. The method of claim 4, wherein, if the raw image is obtained using a red-green-blue (RGB) color filter array, the ratio of the selected color channel values is ratio of two values of R, G, B, and if the raw image is obtained using a cyan-magenta-yellow (CMY) color filter array, the ratio of the selected color channel values is ratio of two values of C, M, Y.

6. The method of claim 4, wherein the calculation of the CCT of the raw image, comprises referencing a lookup table which indicates a relationship between color channel value ratios and CCTs.

7. The method of claim 4, wherein the calculation of the transformation matrix, comprises referencing a lookup table which indicates a relationship among CCTs, reference CCTs, and transformation matrices.

8. An apparatus for generating an image, the apparatus comprising:
  an image acquisition module which acquires a plurality of images using different exposure durations of a single scene under substantially the same lighting conditions;
  a white balancing module which white-balances each of the raw images having different correlated color temperature(CCT)s based on a same arbitrary reference correlated color temperature (CCT) set by a user; and
  an image synthesization module which synthesizes the white-balanced images to generate a High Dynamic Range (HDR) image which is colorimetrically corrected and to expand a dynamic range for display devices with improving color fidelity, wherein the white balancing module comprises a color channel value selector which selects one or more color channel values within a predefined threshold range from the raw image, and wherein the color channel value selector sets a color channel value corresponding to noise as a lower threshold when the raw image is a short-exposure image and selects one or more color channel values greater than the lower threshold from the raw image, and the color channel value selector sets a color channel value that saturates as an upper threshold when the raw image is a long-exposure image and selects one or more color channel values less than the upper threshold from the raw image.

9. The apparatus of claim 8, wherein the white balancing module further comprises:
   a luminance calculation unit which calculates luminance of a raw image;
   a relative trimulus value calculation unit which calculates relative trimulus values of the raw image with respect to the arbitrary reference correlated color temperature (CCT); and
   a relative trimulus value conversion unit which converts the relative trimulus values of the raw image into trimulus values corresponding to the luminance of the raw image.

10. The apparatus of claim 9, wherein the luminance calculation unit calculates the luminance of the raw image using the following equation:

$$Y=K(W1*C1+W2*C2+W3*C3)$$

where Y indicates the luminance of the raw image, C1, C2, and C3 indicate color channel values of the raw image, W1, W2, and W3 indicate weights respectively corresponding to the color channel values C1, C2, and C3, and K is a coefficient that affects the luminance Y and is determined according to an exposure duration, a diaphragm value, or a gain value.

11. The apparatus of claim 9, wherein the relative trimulus value calculation unit comprises:
   a CCT calculator which calculates a CCT of the raw image by calculating a ratio of the selected color channel values; and
   a transformation matrix calculator which calculates a transformation matrix that transmits the raw image into an image having the reference CCT using the CCT of the raw image, the relative trimulus value calculation unit calculating the relative trimulus values of the raw image by applying the transformation matrix to the raw image.

12. The apparatus of claim 11, wherein, if the raw image is obtained using a red-green-blue (RGB) color filter array, the ratio of the selected color channel values is ratio of two values of R, G, B, and if the raw image is obtained using a cyan-magenta-yellow (CMY) color filter array, the ratio of the selected color channel values is ratio of two values of C, M, Y.

13. The apparatus of claim 11, wherein the CCT calculator references a lookup table which indicates a relationship between color channel value ratios and CCTs.

14. The apparatus of claim 11, wherein the transformation matrix calculator references a lookup table which indicates a relationship among CCTs, reference CCTs, and transformation matrices.

* * * * *